United States Patent [19]

Patton, Jr. et al.

[11] 4,334,032

[45] Jun. 8, 1982

[54] FOAMED POLYMERS CONTAINING LOW MOLECULAR WEIGHT URETHANE MODIFIER COMPOUND

[75] Inventors: John T. Patton, Jr., Wyandotte, Mich.; Herwart C. Vogt, Sparta, N.J.

[73] Assignee: BASF Wyandotte Corporation, Wyandotte, Mich.

[21] Appl. No.: 243,536

[22] Filed: Mar. 13, 1981

Related U.S. Application Data

[63] Continuation of Ser. No. 77,845, Sep. 21, 1979, abandoned.

[51] Int. Cl.$^3$ .................. C08G 18/14; C08G 18/71; C08G 18/16
[52] U.S. Cl. .................. 521/115; 521/128; 521/137; 560/24; 560/25; 560/26; 560/27
[58] Field of Search .................. 521/115, 137, 128; 528/75

[56] References Cited

U.S. PATENT DOCUMENTS

| | | | |
|---|---|---|---|
| 3,437,608 | 4/1969 | Pohl | 521/115 |
| 3,886,102 | 5/1975 | Olstowski | 260/18 TN |
| 3,891,579 | 6/1975 | Cenker et al. | 528/49 |
| 3,925,527 | 12/1975 | Kleimann et al. | 521/128 |
| 3,933,938 | 1/1976 | Rhodes | 528/75 |
| 4,052,346 | 10/1977 | Rudner et al. | 521/112 |
| 4,165,414 | 8/1979 | Narayan et al. | 521/117 |
| 4,189,544 | 2/1980 | Thompson | 521/128 |

*Primary Examiner*—H. S. Cockeram
*Attorney, Agent, or Firm*—Norbert M. Lisicki

[57] ABSTRACT

Foamed polymers such as polyurethanes useful, for instance, as cushioning, insulation, and in reaction injection molding to produce thin section moldings can be produced without substantial reduction in physical properties by the incorporation therein of about 2 percent to about 75 percent by weight based upon the weight of said polymer of at least one non-reactive, liquid urethane modifier compound processing aid or flame-retardant additive. Said modifier has a low viscosity at ambient temperatures and is a low-molecular weight urethane adduct formed by the reaction of (1) at least one polyisocyanate and at least one monohydric alcohol or (2) at least one monofunctional isocyanate with at least one monohydric or polyhydric alcohol or (3) at least one isocyanate-terminated quasi-prepolymer with at least one monohydric alcohol. Said modifier can also consist of mixtures of (1), (2), and (3). Utilizing halogenated alcohols, flame-retardant polymer foams such as polyurethane foams can be prepared. Unexpectedly, microcellular, rigid, high-resilience, and flexible foamed polyurethanes can be prepared utilizing substantial proportions, such as flame-retardant amounts, of the modifier compound without substantial reduction in physical properties of the foam.

4 Claims, No Drawings

FOAMED POLYMERS CONTAINING LOW MOLECULAR WEIGHT URETHANE MODIFIER COMPOUND

This application is a continuation of Ser. No. 77,845, filed Sept. 21, 1979, and now abandoned.

BACKGROUND OF THE INVENTION

1. Field of the Invention

This invention relates to foamed polymer compositions.

2. Description of the Prior Art

It is known to incorporate into polyurethanes cross-linked particulate polymers preferably containing groups which react with isocyanates such as unsaturated polymerized alcohols, esters of unsaturated carboxylic acids, or unsaturated copolymerizable polyols from U.S. Pat. No. 4,049,590. Flexible polyurethane foams have been rendered permanently flame-retardant by the incorporation of halogenated glycols such as tribromoneopentyl glycol or dibromoneopentyl glycol in combination with phosphoric anhydride which has been reacted with an alkylene oxide or haloalkylene oxides. Such compositions are disclosed in U.S. Pat. Nos. 4,052,346 and 3,948,860. It is also known from U.S. Pat. No. 3,886,102 that rapid-setting polyurethane molding compositions can be prepared in the presence of liquid modifier compounds.

SUMMARY OF THE INVENTION

There are disclosed foamed polymers such as polyurethane compositions comprising the reaction product (A) of at least one polyhydric alcohol with at least one organic polyisocyanate in admixture with (B) a low molecular weight non-reactive modifier compound which is the reaction product of at least one polyisocyanate with at least one monohydric alcohol or at least one monofunctional isocyanate with a stoichiometric amount of at least one monohydric alcohol or at least one monofunctional isocyanate with a stoichiometric amount of at least one polyhydric alcohol or at least one isocyanate-terminated pre-polymer with a stoichiometric amount of at least one monohydric alcohol. The disclosed modifier compounds are useful as processing aids or flame-retardant additives for polyurethane foams. Microcellular, rigid, high-resilience, and flexible foam polyurethanes can be prepared. Said foamed polyurethanes can be rendered flame retardant, if desired, by use of a halogenated monohydric or polyhydric alcohol in the preparation of the modifier compound.

DESCRIPTION OF THE PREFERRED EMBODIMENTS

The foamed polyurethanes of the invention are particularly desirable over the prior art foamed polyurethanes since substantial amounts of the disclosed low viscosity modifier compound can be utilized without substantial reduction in physical properties of the foam and, in certain instances, with improved physical properties. For instance, in flexible urethane foams containing up to 50 percent of the modifier compound disclosed, tensile and tear strength can be improved without substantial reduction in compression set as compared to unmodified flexible foams of the prior art. In addition, because the physical properties of polyurethane foam prepared utilizing the modifier compound are substantially unaffected by the incorporation of substantial amounts of the modifier compound, it is possible to provide flame-retardant polyurethane foams having permanent flame retardancy without substantial reduction in physical properties as compared to unmodified foams of the prior art. As a processing aid, the use of the liquid modifier compounds of the invention permits the facile use as ingredients of heretofore difficult to use solids or high viscosity liquids in the preparation of the foams of the invention. Thus, pigments, fillers, solid catalysts, and high viscosity polyurethane reactants can be readily incorporated.

The foamed polyurethanes of the invention can be prepared from the reaction of at least one polyhydric alcohol including a polyether polyol with an organic polyisocyanate in the presence of at least one modifier compound, as described herein. The ratio of reactants, excluding the modifier compounds, is chosen so as to provide an NCO:OH ratio of about 0.8:1 to about 1.5:1, preferably about 0.9:1 to about 1.2:1.

THE MODIFIER COMPOUND

The preparation of the low-molecular weight modifier compounds is more particularly described by reference to the following equations:

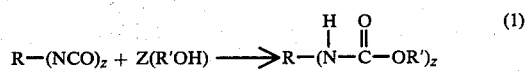

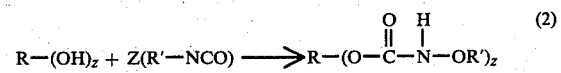

wherein R is monovalent or polyvalent and R' is monovalent each individually selected from aliphatic, alicyclic, aromatic, aralkyl, and alkaryl radicals having up to about 18 carbon atoms in the aliphatic portion of the radical and 6 to 12 carbon atoms in the aromatic portion of the radical, Z is equal to z and is the number of moles of alcohol or isocyanate compound utilized, and z is an integer corresponding to the valence of R and is equal to the number of functional groups on the alcohol or isocyanate compound. The modifier compounds have a molecular weight of about 90 to about 2000, preferably about 150 to about 900. These compounds are also disclosed in copending application entitled RIGID, NON-CELLULAR POLYISOCYANATE MODIFIED WITH REACTION PRODUCT OF AN ISOCYANATE AND AN ALCOHOL, filed on even date herewith, Ser. No. 243,537, incorporated herein by reference.

THE ALCOHOL

The suitable monohydric and polyhydric alcohols useful in the preparation of the modifier compounds and the polyhydric alcohols useful in the preparation of the foamed polyurethanes generally have a hydroxyl equivalent weight of about 30 to about 3000, preferably about 30 to about 1500. Said polyhydric alcohols can contain up to about 8 hydroxyl groups in the molecule, and can be a graft polyol or mixture thereof with a polyether or polyester polyol or can be merely a polyether or a polyester polyol, or mixture thereof, having up to about 18 carbon atoms such as hydroxyl-terminated polyether polyols or hydroxyl-terminated polyester polyols, as described below.

Suitable monohydric alcohols for preparing the modifier compound include both aromatic and aliphatic monohydric alcohols having up to 18 carbon atoms, such as n-butanol, 2-chloroethanol, n-octanol, 2-ethylhexanol, isooctyl alcohol, nonanol, 3,5,5-trimethylhexanol, isodecyl alcohol, benzyl alcohol, cyclohexanol, 2,4,4,4-tetrachloro-1-butanol, 2,3-dichloropropanol, 2,3-dibromopropanol, 2,2,2-trichloroethanol, 2,2,2-tribromoethanol, 1,1,1,3,3,3-hexachloro-2-propanol, 1,1-dichloro-2-propanol 1,3-dibromo-2-propanol, 1,1,1-trichloro-2-propanol, 1,1,3,3-tetrabromo-2-propanol, the isomeric tribromophenols, the isomeric tetrachlorophenols, pentachlorophenol, 2-methylol-1,4,5,6,7,7-hexachlorobicyclo-(2.2.1)-5-heptene and the like.

Also, the reaction products of halogenated alkylene oxides and monofunctional active hydrogen compounds are useful in the present invention. Thus, hydroxyl containing compounds such as 1-methoxy-4,4,4-trichloro-2-butanol, 1-ethoxy-3,3,3-trichloro-2-propanol, 2-methoxy-3,3-dichloropropanol and the like may be used. Suitable polyhydric alcohols include both aliphatic and aromatic polyhydric compounds, for example, ethylene glycol, trimethylene glycol, propylene glycol, tetramethylene glycol, 1-methyl trimethylene glycol, butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, sorbitol, diethylene glycol, dipropylene glycol, 2,3-dibromo-2-butene-1,4-diol, 2,3-dibromobutane-1,4-diol, dibromoneopentyl glycol, 4,4'-isopropylidenediphenol, also known as Bisphenol A, tetrabromobisphenol A, dibromobisphenol A, resorcinol, catechol, hydroquinone, and mixtures thereof.

Suitable polyether polyols for the preparation of the modifier compound and the polyurethane foam are the adducts of a polyhydroxyl-containing compound preferably having a hydroxyl functionality of 2 to about 8 and a vicinal epoxy compound, for example, ethylene oxide, 1,2-propylene oxide, 1,2-butylene oxide, epichlorohydrin, epibromohydrin, and mixtures thereof. When the polyether polyols are solids at room temperature, they are suitably modified for use by dissolving in a suitable solvent selected from the liquid modifier compounds which are disclosed herein. As is well known to those skilled in the art, adducts of polyhydroxyl-containing compounds and vicinal epoxy compounds are often obtained as liquids at ambient temperatures instead of solids where such compounds are prepared using ethylene oxide in admixture with a small amount of 1,2-propylene oxide.

Suitable polyester polyols useful in the preparation of the polyurethane foams and modifier compounds are, for example, aliphatic or aromatic polyester polyols preferably having a hydroxyl functionality of 3 to about 8 and are prepared, for example, by esterifying any suitable aliphatic or aromatic polyhydric alcohol with an aromatic or aliphatic dicarboxylic acid or anhydride thereof having 2 to about 20 carbon atoms. Any suitable polycarboxylic acid may be used such as oxalic acid, succinic acid, glutaric acid, adipic acid, pimelic acid, suberic acid, azelaic acid, sebacic acid, maleic acid, fumaric acid, glutaconic acid, β-hydromuconic acid, α-butyl-α-ethyl-glutaric acid, α,β-diethylsuccinic acid, phthalic acid, isophthalic acid, terephthalic acid, hemimellitic acid, and 1,4-cyclohexanedicarboxylic acid.

Any suitable polyhydric alcohol, including both aliphatic and aromatic, halogenated and non-halogenated polyhydric alcohols can be used to prepare the foamed polyurethanes of the invention and the modifier compound such as ethylene glycol, trimethylene glycol, propylene glycol, dipropylene glycol, 1,4-butanediol, 1,3-butanediol, 1,2-butanediol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. The aliphatic polyols useful for reaction with said dicarboxylic acid have up to about 20 carbon atoms and up to about 8 hydroxyl groups per molecule as illustrated by polyhydroxyl-containing compounds such as glycerine, trimethylolpropane, pentaerythritol, sorbitol, sucrose, and mixtures thereof.

THE ORGANIC ISOCYANATE

Suitable organic isocyanates which can be employed in the preparation of the foamed polyurethane and modifier compounds include any organic polyisocyanate having an average of at least 2 isocyanate groups per molecule and no other substituent capable of reaction with the hydroxyl groups of the hydroxyl containing compound. Preferably, said polyisocyanates have an average functionality of 2. Representative organic polyisocyanates include the aromatic diisocyanates, such as 2,4-toluene diisocyanate, 2,6-toluene diisocyanate, mixtures of 2,4- and 2,6-toluene diisocyanate, crude toluene diisocyanate, diphenylmethane diisocyanate, and the like; the aromatic triisocyanates such as 4,4',4''-triphenylmethane triisocyanate, 2,4,6-toluene triisocyanates; the aromatic tetraisocyanates, such as 4,4'-dimethyldiphenylmethane-2,2'-5,5'-tetraisocyanate, and the like; arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include hydrogenated methylene diphenyl diisocyanate, polymethylene polyphenylene polyisocyanate, m-phenylene diisocyanate, naphthylene-1,5-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyldiphenylmethane-4,4'-diisocyanate. These polyisocyanates are prepared by conventional methods known in the art such as the phosgenation of the corresponding organic amine. Useful organic monoisocyanates for preparation of the modifier compound include phenylisocyanate and dodecylisocyanate.

QUASI-PREPOLYMER ORGANIC POLYISOCYANATES

Still another class of organic polyisocyanates contemplated for use herein in the preparation of the foamed polyurethanes and urethane polymer modifier compound are the so-called "quasi-prepolymers". These quasi-prepolymers are prepared by reacting an excess of organic polyisocyanate or mixtures thereof with a minor amount of an active hydrogen-containing compound as determined by the well-known Zerewitinoff test as described by Kohler in *Journal of the American Chemical Society*, 40, 3181 (1927). These compounds and their methods of preparation are well known in the art. The use of any one specific active hydrogen compound is not critical hereto, rather any such compound can be employed herein.

Quasi-prepolymers can be prepared by reacting an excess of an organic polyisocyanate with any organic compound having at least two active hydrogen-containing groups as determined by the Zerewitinoff method which are reactive with an isocyanate group such as —OH, —NH—, —COOH, and —SH. Examples of suitable types of organic compounds for the preparation of said quasi-prepolymers are (1) hydroxyl-terminated polyesters including polyester amides, (2) polyalkylene ether polyols, (3) alkylene oxide adducts of phosphorus-containing acids, (4) hydroxyl-terminated polyacetals, and (5) aliphatic thiols including alkane, alkene and alkyne thiols having two or more —SH groups, and (6) polyamines including both aromatic, aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxyl-terminated polyester may be used to prepare quasi-prepolymers such as are obtained, for example, from polycarboxylic acids and polyhydric alcohols. Any suitable polycarboxylic acid may be used such as oxalic acid, succinic acid, glutaric acid, adipic acid, pimelic acid, suberic acid, azelaic acid, sebacic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used, such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-terminated polyester used to prepare quasi-prepolymers may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-terminated polyester with only a portion of the components being a diamine such as ethylenediamine.

Any suitable polyoxyalkylene ether polyol may be used to prepare the quasi-prepolymer such as the polymerization product of an alkylene oxide or of an alkylene oxide with a polyhydric alcohol. Any suitable polyhydric alcohol may be used to prepare the polyether polyol such as those disclosed above for use in the preparation of the hydroxyl-terminated polyesters. Any suitable alkylene oxide may be used to prepare the polyether polyol such as ethylene oxide, propylene oxide, butylene oxide, amylene oxide, and heteric or block copolymers of these oxides. The polyoxyalkylene polyols may be prepared from other starting materials such as tetrahydrofuran and alkylene oxide-tetrahydrofuran copolymers; epihalohydrins such as epichlorohydrin; as well as aralkylene oxides such as styrene oxide. The polyoxyalkylene polyols may have either primary or secondary hydroxyl groups and, preferably, are polyethers prepared from alkylene oxides having from 2 to 6 carbon atoms such as polyoxyethylene glycols, polyoxypropylene glycols, and polyoxybutylene glycols. The polyoxyalkylene polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459 Alkylene oxide adducts of Mannich condensation products are also useful in the invention.

Alkylene oxide adducts of acids of phosphorus which may be used in the preparation of the quasi-prepolymer include those neutral adducts prepared from the alkylene oxides disclosed above for use in the preparation of polyoxyalkylene polyols. Acids of phosphorus which may be used are acids having a $P_2O_5$ equivalency of from about 72 percent to about 95 percent. The phosphoric acids are preferred.

Any suitable hydroxyl-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Also, suitable polyamine may be used including aromatic polyamines such as methylene dianiline, polyarylpolyalkylene polyamine (crude methylene dianiline), p-aminoaniline, 1,5-diaminonaphthalene, and 2,4-diamino-toluene; aliphatic polyamines such as ethylenediamine, 1,3-propylenediamine; 1,4-butylenediamine, and 1,3-butylenediamine, as well as substituted secondary derivatives thereof.

In addition to the above amine-, thiol- or hydroxyl-containing compounds, other compounds which may be employed in the preparation of quasi-prepolymers, modifier compounds of the invention, and foamed polyurethanes include graft polyols. These polyols are prepared by the in situ polymerization product of a vinyl monomer in a reactive polyol medium and in the presence of a free radical initiator. The reaction is generally carried out at a temperature ranging from about 40° to 150° C. The reactive polyol medium generally has a molecular weight of at least about 400 and a hydroxyl number ranging from about 30 to about 600. The graft polyol has a molecular weight of at least about 1500 and a viscosity of less than 40,000 cps. at 10 percent polymer concentration. A more comprehensive discussion of the graft polyols and their method of preparation can be found in U.S. Pat. Nos. 3,383,351; 3,304,273; 3,652,639 and 3,823,201, the disclosures of which patents are hereby incorporated by reference.

Also, polyether polyols containing ester groups can be employed in the preparation of the quasi-prepolymers. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541 and 3,639,542. As is clear from the above, the particular polyol ingredient employed in the preparation of the quasi-prepolymer is not a critical aspect of the present invention. Any compound containing at least two reactive hydrogen atoms can be so used.

THE AMINE- OR NON-AMINE-CONTAINING CATALYST

Both amine- and non-amine-containing catalysts for urethane formation which are characterized as organometallic or amine compounds which are solids or liquids at ambient temperature are employed in the preparation of the foams of the invention to catalyze the reaction of the polyhydric alcohol and the organic polyisocyanate. Useful metalloorganic compound, non-amine-containing catalysts include, for example, compounds of tin, zinc, lead, mercury, cadmium, bismuth and antimony, for example, the above metal salts of a carboxylic acid having from 2 to about 20 carbon atoms including, for example, stannous octoate, dibutyltin dilaurate, dibutyltin diacetate, zinc laurate, lead octoate, lead naphthanate, lead oleate, phenyl mercuric propionate, and mixtures thereof. Preferably, these catalysts are employed in liquid form and those catalysts which are not ordinarily liquid at room temperature can be utilized by preparing an organic solvent solution of the product. Suitable organic solvents for amine catalysts can include, for example, diols such as dipropylene glycol, tripropylene glycol, ethylene glycol, propylene glycol, or the polyols utilized as reactants in the preparation of the foamed polyurethanes of the invention. Suitable solvents for the metallo-organic catalysts are esters such as dioctylphthalate and didecylphthalate.

The concentration of the metallo-organic catalyst is generally about 0.1 weight percent of the weight of the total mixture of ingredients to about 8 weight percent, preferably about 0.2 weight percent to about 2 weight percent and most preferably about 1 weight percent to about 2 weight percent, all based on the total weight of the polyhydric alcohol.

Useful amine catalysts include those conventionally used in the preparation of urethanes such as tetramethylbutanediamine, triethylenediamine, dimethylaminoethanol, bis-(dimethylamino)ethyl ether, N-ethylmorpholine, N,N'-dimethylpiperazine, triethylamine, and dimethylcyclohexylamine. In addition, amine-containing polyols, prepared by the reaction of an alkylenediamine such as ethylenediamine, said alkyl group having about two to about eight carbon atoms, with at least one lower alkylene oxide such as ethylene oxide, propylene oxide, butylene oxide, etc., have been found to be effective catalysts for the preparation of the foams of the invention. The amount of conventional amine catalyst used is generally about 0.2 percent by weight to about 8 percent by weight based upon the weight of the polyhydric alcohol used. Preferably used is about 0.5 percent by weight to about 2 percent by weight, and most preferably about 1 percent to about 2 percent by weight, all based upon the total weight of the polyhydric alcohol used.

The amine-containing polyol is used in more substantial amounts such as about 5 to about 100 percent by weight of the weight of the polyhydric alcohol utilized, preferably about 10 to about 50 percent by weight and most preferably about 10 to about 30 percent by weight. It may be desirable to use the amine-containing polyol as the sole catalyst as well as the sole source of hydroxyl groups for reaction with the isocyanate group-containing compound. In this case, the proportion used is governed by the amount of polyol necessary to obtain the desired physical characteristics in the foam. Preferably the amine catalysts are employed in the liquid form and those catalysts which are not ordinarily liquid at ambient temperatures are utilized by preparing organic solvent solutions thereof.

The foams of the invention are useful for a variety of purposes, for instance, the microcellular foamed polyurethanes also known as high-density urethane foams from reaction injection molding (RIM) find use in the manufacture of thin section automobile trim components such as bumper fascia. The high-resilience foamed polyurethanes produced in accordance with the process of the invention are useful in providing foams especially suited for seating, for instance, automotive seat cushioning. The flexible foamed polyurethane polymers prepared in accordance with the process of the invention are useful in such various applications as filters, sound deadening layers or devices, packaging materials, heat and cold insulation, garment interlining, rug underlays, mattresses, and pillows as well as automobile cushioning and upholstery. In all these applications, flame-retardancy can be permanently built into the foamed product and thus provide a commercially desirable product not heretofore easily obtainable in polyurethane foam technology without sacrifice of other desirable physical properties.

The amount of modifier compound of the invention which is utilized as a processing aid in the preparation of the polyurethane foams of the invention is not critical and can vary between about 2 percent to about 75 percent by weight based upon the total weight of the polyol and the organic polyisocyanate used to prepare the polyurethane foam. It is preferred to use an amount of about 3 percent to about 50 percent by weight per 100 parts by weight of the total weight of the polyol and the polyisocyanate. Most preferably, about 5 percent to about 30 percent by weight of the modifier compound is utilized. Where flame-retardancy is desired, increased minimum proportions of said modifier compound are useful, it being found that generally a flame-retardant amount of said modifier is in the range of about 15 parts to about 35 parts by weight per 100 parts of the total weight of the polyol and the organic polyisocyanate weights. Lesser amounts may be ineffective and greater amounts may not produce an increase in flame-retardancy commensurate with the increased cost. However, greater amounts can be used if desired without departing from the scope of the invention. A preferred range of modifier compound to achieve flame-retardancy in the polyurethane foams of the invention is about 20 parts to about 25 parts by weight per 100 parts by weight of the total weight of the polyol and the polyisocyanate.

In addition to the essential reactants set forth above, any of the known compounding ingredients for the preparation of polyurethane foams can be included if desired. These include but are not restricted to fillers, pigments, dyes, plasticizers, anti-static agents, anti-microbial agents, anti-oxidants, ultra-violet absorbers, and discoloration inhibitors. Although it is not generally necessary or desirable to include with the essential flame-retardants other conventional flame-retardants in the polyurethane foams of the invention, other conventional flame-retardants such as dibromo- or tribromoneopentyl alcohol, antimony oxide, zinc borate, or phosphate esters can be included in the polyurethane foam compositions of the invention without departing from the scope of the present invention. In addition, if desired, the finished and cured foam can be coated or impregnated with any of the conventional flame-retardant compositions known to the art to be useful.

The following examples of the process and product of the invention illustrate the various aspects of the invention but are not intended to limit its scope. When not otherwise specified throughout this specification and claims, temperatures are given in degrees centigrade and all parts, percentages and proportions are by weight.

DESCRIPTION OF COMPONENTS EMPLOYED IN THE EXAMPLES

Polyol A is a 1,2-propylene oxide adduct of glycerine having an equivalent weight of about 1000, an OH number of about 58, and a specific gravity of 1.00 at 25° C. as compared to the specific gravity of water, as measured at 25° C.

Polyol B is a propylene oxide adduct of trimethylolpropane which is capped with 13 percent ethylene oxide so as to have a hydroxyl number of 34–36.

Polyol C is a propylene oxide adduct of glycerine capped with 16.5 percent ethylene oxide having a hydroxyl number of about 35.

Polyol D is a graft copolymer dispersion in a polyol having a hydroxyl number of about 26 and a vinyl polymer content of 20 percent by weight prepared by the in situ polymerization of a mixture of styrene and acrylonitrile in a polyol wherein said polyol is prepared by the sequential addition of a mixture of propylene oxide, allyl glycidyl ether, and ethylene oxide to glycerol as initiator.

Polyol E is a propylee oxide adduct of pentaerythritol having a hydroxyl number of about 555.

DABCO S-25 is a mixture of 25 parts by weight triethylene diamine and 75 parts by weight 1,4-butanediol.

DABCO 33LV is a product sold by Air Products and Chemicals which is a non-aqueous catalyst containing one part by weight of triethylene diamine and two parts by weight of dipropylene glycol.

L-6202 is a silicone-type surfactant sold under this trademark by Union Carbide Corporation.

Freon 11 is a low-boiling fluorocarbon blowing agent for rigid foams sold under this trademark by the duPont Company.

Niax A-1 is the trademark for a 70 percent by weight solution in dipropylene glycol of bis(2-dimethylamineoethyl)ether.

Niax A-4 is an amine catalyst sold under this trademark by Union Carbide Corporation.

Silicone surfactant L-5303 is the trademark for this product as sold by Union Carbide Corporation.

DC-193 is the trademark for a surfactant sold by Dow-Corning Corporation.

ISONATE 180 is the trademark for a prepolymer based upon diphenylmethane diisocyanate and dipropylene glycol sold by the Upjohn Company.

Catalyst T-9 is the trademark for a tin octoate catalyst which is commercially available from M&T Chemical having the following properties:
  Specific gravity at 25° C., 1.25 to 1.27
  percent tin total, 28–29%
  percent stannous of total tin, 96.0% minimum
  viscosity at 25° C., 360 cs. maximum.

EXAMPLE 1

The 2-ethylhexanol adduct of an 80/20 mixture in percent by weight respectively of 2,4- and 2,6-toluenediisocyanate was prepared for use in preparing the polyurethane foams of the invention. The adduct is a liquid at ambient temperature. Use of said adduct as a component of said foams permits preparation of foamed articles without substantially detracting from the physical properties thereof.

Utilizing a five liter flask equipped with stirrer, thromometer, addition funnel, nitrogen sparge and a column with a drying tube, there was added an 80/20 mixture of 2,4- and 2,6- isomers of toluenediisocyanate in the amount of 1741 grams (10.0 mole). To this there was then added with rapid stirring 2630 grams (20.0 mole plus 1 percent excess) of anhydrous 2-ethylhexanol at a temperature of 27° C. During addition, the temperature increased and the mixture required cooling to maintain a temperature of 70° C.–80° C. To insure completeness of reaction, the mixture was heated for one hour at a temperature of 70° C.–80° C. upon completion of the exotherm.

EXAMPLES 2–6

In the same manner as illustrated in Example 1, 80/20 respectively 2,4- and 2,6-toluenediisocyanate adducts of the following alcohols were prepared utilizing the proportions indicated in Table I below.

TABLE I

| | Adduct Modifiers of the Invention | | | | |
|---|---|---|---|---|---|
| | 2,4 and 2,6 isomers of toluenediisocyante | | alcohol | | adduct molecular weight |
| Examples | grams | moles | grams | moles | (average) |
| 2 | 2442 | 14 | 2100 | 28.3(n-butanol) | 322 |
| 3 | 1742 | 10 | 1610 | 20(2-chloroethanol) | 335 |
| 4 | 1045 | 6 | 610 | 6(cyclohexanol) | 405 |
| | | | 781 | 6(2-ethylhexanol) | |
| 5 | 697 | 4 | 268 | 2(dipropylene glycol) | 742 |
| | | | 520 | 4(2-ethylhexanol) | |
| 6 | 174 | 1 | 432 | 2(2,4,4,4-tetrachlorobutanol-1) | 598 |

EXAMPLE 7

Utilizing the same procedure as in Example 1, diphenylmethane diisocyanate was utilized to prepare an adduct with 2-ethylhexanol by reacting 2002 grams (8 moles) of said isocyanate with 2084 grams of 2-ethylhexanol (16 moles). The product was found to have a molecular weight of 511.

EXAMPLE 8

Following the same procedure as in Example 1, an isocyanate-monohydric alcohol adduct was prepared by blending 1191 grams of phenylisocyanate (10 moles) and 1302 grams of 2-ethylhexanol (10 moles) to produce an adduct having a molecular weight of 250 which is a liquid at ambient temperature useful as a modifier in the preparation of the polyurethane compositions of the invention.

EXAMPLES 9–12

Following the same procedure as in Example 8, modifier compounds of the invention are prepared by substituting tetrabromobisphenol A, dibromobisphenol A, 2,3-dibromobutane-1,4-diol, and dibromoneopentyl glycol for the 2-ethylhexanol of Example 8.

EXAMPLES 13-17

Utilizing the modifier compound of Example 1, flexible molded polyurethane foams were prepared using materials and proportions indicated in Table II in comparison with Control Example 17. Physical properties are shown in Table III.

TABLE II

Flexible Polyurethane Foams of the Invention

| Example | Polyol A (grams) | Modifier Compound (grams) | Toluene Diisocyanate (grams) | Catalyst T-9 | Water | DABCO 33LV | L-6202 |
|---|---|---|---|---|---|---|---|
| 13 | 300 | 15 | 150 | 0.5 | 12 | 0.9 | 3 |
| 14 | 300 | 60 | 150 | 0.5 | 12 | 0.9 | 3 |
| 15 | 300 | 225 | 150 | 0.7 | 12 | 0.9 | 3 |
| 16 | 300 | 150 | 150 | 0.5 | 12 | 0.9 | 3 |
| (control) 17 | 300 | — | 150 | 0.5 | 12 | 0.9 | 3 |

TABLE III

Physical Properties of Flexible Foams of the Invention

| Example | Density pcf | Tensile Strength psi | Elongation % | Tear Strength psi | 90% Compression Set, % |
|---|---|---|---|---|---|
| 13 | 1.5 | 14 | 200 | 2.0 | 8.5 |
| 14 | 1.7 | 5.6 | 110 | 1.4 | 10.2 |
| 15 | 2.3 | 9.2 | 150 | 2.4 | 16.0 |
| 16 | 2.1 | 3.7 | 80 | 2.4 | 10.1 |
| 17 | 1.4 | 13.6 | 160 | 1.8 | 8.2 |

EXAMPLES 18-20

Utilizing the modifier compound of Example 1, microcellular foams were prepared using materials and proportions indicated in Table IV. Physical properties obtained on these foams are shown in Table V.

TABLE IV

Microcellular Foam Formulations

| Example | Polyol B (grams) | Modifier Compound (grams) | 1,4-Butanediol (grams) | DABCO S-25 (grams) | ISONATE 180 (grams) |
|---|---|---|---|---|---|
| 18 | 100.0 | 10.0 | 40.0 | 3.0 | 126 |
| 19 | 100.0 | 20.0 | 40.0 | 3.0 | 118 |
| 20 | 100.0 | 30.0 | 40.0 | 3.0 | 111 |

TABLE V

Physical Properties of Microcellular Foams of the Invention

| Example | Density (pcf) | Tensile Strength (psi) | Elongation (%) | Tear Strength (per inch) | Shore D Hardness |
|---|---|---|---|---|---|
| 18 | 62.6 | 3190 | 70 | 320 | 66-64 |
| 19 | 61.9 | 2890 | 60 | 255 | 63-62 |
| 20 | 62.4 | 2790 | 100 | 293 | 64-61 |

EXAMPLE 21

Using the modifier of Example 1, a high resilience molded foam is prepared as follows: mix the modifier of Example 1, 20 parts by weight, with Polyol C, 70 parts by weight; Polyol D, 30 parts by weight; water 2.5 parts by weight; Silicone Surfactant L-5303, 1.2 parts by weight; Niax A-1 catalyst, 0.12 parts by weight; Niax A-4 catalyst, 0.30 parts by weight; and dibutyltin dilaurate, 0.03 parts by weight. Just prior to deposition into a mold, the above mixture is combined with an 80/20 parts by weight mixture of, respectively, toluene diisocyanate and polymethylene polyphenyl polyisocyanate, 32.5 parts by weight, and the mixture is allowed to foam.

EXAMPLE 22

Using the modifier of Example 1, a rigid foam is prepared as follows: a mixture is prepared of 20 parts by weight of the modifier of Example 1 with Polyol E, 100 parts by weight; DABCO-33LV, 2.0 parts by weight; and Dow Corning DC-193 surfactant, 1.5 parts by weight. Polymethylene polyphenyl polyisocyanate, sold under the trademark PAPI by the Upjohn Company, 136.4 parts by weight is separately combined with Freon 11 in the amount of 35 parts by weight and the above two mixtures are combined and poured into a mold. Blowing of the foam takes place as the heat of the reaction volatilizes the Freon 11. A rigid foam is produced.

EXAMPLES 23-26

Utilizing the modifier compounds of Examples 9-12, flexible flame retardant polyurethane foams are prepared using the proportions of Example 16.

While this invention has been described with reference to certain specific embodiments, it will be recognized by those skilled in the art that many variations are possible without departing from the scope and spirit of the invention and therefore, that it will be understood that it is intended to cover all changes and modifications of the invention which do not constitute departures from the spirit and scope of the invention.

The embodiments of the invention in which an exclusive privilege or property is claimed are defined as follows:

1. In a polyurethane foam prepared by the reaction of a polyoxyalkylene polyether polyol with an organic polyisocyanate in the absence of a trimerization catalyst, the improvement which comprises incorporating in the preparation of said foam from about 2 percent by weight to 75 percent by weight based upon the total weight of the polyether polyol and the organic polyisocyanate an isocyanate-free, hydroxyl group-free reaction product of an organic isocyanate with a monohydric or polyhydric compound containing from 1 to 4 hydroxyl groups and from 2 to 18 carbon atoms.

2. The foam of claim 1 wherein said organic isocyanate is selected from the group consisting of phenyl isocyanate, toluene diisocyanate and diphenylmethane diisocyanate.

3. The foam of claim 1 wherein said monohydric or polyhydric compound is selected from the group consisting of butanol, 2-ethylhexanol, glycerine, cyclohexanol, dipropylene glycol, butylene glycol, trimethylolpropane and pentaerythritol.

4. The foam of claim 1 wherein said monohydric or polyhydric compound is selected from the group consisting of 2,4,4,4-tetrachloro-1-butanol, 2,3-dichloropropanol, 2,3,-dibromopropanol, 2-chloroethanol, 1,1,1,3,3,3-hexachloro-2-propanol, pentachlorophenol, 2-methylol-1,4,5,6,7,7-hexachlorobicyclo-(2.2.1)-5-heptene, tetrabromobisphenol A, dibromobisphenol A, 2,3,-dibromobutanediol-1,4, dibromoneopentyl glycol, and 1,1,1-trichloro-2-propanol.

* * * * *